Patented May 15, 1951

2,552,904

UNITED STATES PATENT OFFICE 2,552,904

VINYL RESIN PLASTICIZED WITH LIQUID COPOLYMER OF DIOLEFIN AND NITRILE

Raymond G. Newberg, Cranford, Ober C. Slotterbeck, Rahway, and Byron M. Vanderbilt, Westfield, N. J., assignors to Standard Oil Development Company, a corporation of Delaware No Drawing. Application June 11, 1946, Serial No. 676,120

5 Claims. (Cl. 260—32.4)

This invention pertains to vinyl resin compositions and particularly to compositions comprising polyvinyl chloride or vinyl chloride copolymers and a plasticizing agent therefor.

Vinyl resins such as polyvinyl chloride and vinyl chloride-vinyl acetate copolymers and the like have been used for a large number of applications involving mainly packaging and protective coatings. These applications require that the resins be readily processable and be capable of giving satisfactory service over a wide range of temperatures which may conceivably vary over the range from —60° to +140° F. In order to meet these specifications it was necessary to plasticize these vinyl resins. Although fairly good success was attained with plasticizers such as tricresyl phosphate, dibutyl phthalate, glyceryl triacetate and the like, such success was of rather limited duration because of the tendency of these plasticizers to leach out or volatilize from the compositions.

It is the object of this invention to provide a permanent plasticizer which will allow normal processing methods and will improve the thermal stability of the vinyl resins.

It is also the object of this invention to prepare plasticized vinyl resin compositions which are flexible over a wide range of temperatures and which contain a plasticizer which cannot be readily leached out or volatilized from the compositions.

It is also an object of this invention to prepare plasticized vinyl resin compositions which retain most of the excellent physical properties, such as tensile strength, of the unplasticized resin compositions.

These and other objects will appear more clearly from the detailed specification and claims which follow:

We have found that low molecular weight, liquid, diene-nitrile copolymers such as those of butadiene and acrylonitrile are excellent plasticizing agents for vinyl resins such as polyvinyl chloride and vinyl chloride copolymers and that vinyl resin compositions plasticized with said liquid polymers may be readily processed as on calenders and the like, show high degrees of flexibility at low temperatures, possess tensile strengths substantially equal to corresponding unplasticized compositions and do not undergo any appreciable degradation in flexibility when contacted with solvents which serve to leach out ordinary plasticizers or when subjected to elevated temperatures sufficient to volatilize many plasticizers.

The low molecular weight, liquid, diene-nitrile copolymers used for plasticizing vinyl resins in accordance with the present invention may be prepared by polymerizing a mixture of a major proportion of a conjugated diolefin of from 4 to 6 carbon atoms per molecule and a minor proportion of a nitrile of a low molecular weight unsaturated fatty acid in aqueous emulsion in the presence of at least 3 and up to about 10–12 weight per cent based on the monomers of an aliphatic mercaptan of from 6 to 16 carbon atoms. Tertiary mercaptans are preferred to primary or secondary mercaptans, but all three types may be employed. For a typical reaction about 3–8% of the tertiary mercaptan derived from the dimer of isobutylene may be used, or about 5–10% of the tertiary mercaptan derived from the trimer of isobutylene, or in still another case about 7–12% of the tertiary mercaptans derived from the tetramer of isobutylene may be employed. It is preferred not to use mercaptans containing more than 16 carbon atoms per molecule and ordinarily those having more than about 12 carbon atoms per molecule are preferably of the tertiary type. The preferred mercaptan is the tertiary mercaptan prepared from diisobutylene (isobutylene dimer). The mercaptan modifying agent may be replaced in whole or in part with other modifying agents such as alkyl xanthogen polysulfides although these reagents are less desirable than the mercaptans since they tend to decrease the reaction rate very appreciably. The modifier may be added to the reaction mixture at the start of the reaction or only part of the modifier may be added initially and the remainder may be added portionwise during the reaction. The latter procedure is especially desirable when carrying the reaction to substantial completion.

It is also desirable, though not essential, to use highly unsaturated fatty acids such as those obtained from linseed or soybean oils for the preparation of the soap emulsifiers. By using soaps of these highly unsaturated fatty acids it is possible to reduce the amount of mercaptan or other polymerization modifier. The amount of emulsifier is about 0.25 to about 5 wt. per cent and the amount of polymerization catalyst is about 0.1 to about 1 wt. per cent based upon the monomers.

The polymerization can be carried out at temperatures as low as about 10° C. and it is generally preferred to carry out the reaction at temperatures between about 30 and 35° C. By the use of polymerization promoters such as low molecular weight amines, alkali-ferro and ferricyanides, inorganic cyanides and the like it is possible to effect a substantial lowering in the temperature of reaction.

Dienes which may be used in the preparation of the plasticizers in accordance with the present invention are conjugated diolefins of from about 4 to about 6 carbon atoms per molecule such as butadiene-1,3, isoprene, piperylene, methyl pentadiene and dimethyl butadiene. The nitriles which may be used as the copolymerizing ingredient are acrylonitrile or methacrylonitrile. The copolymers prepared from mixtures containing 50–90% of conjugated diene and from 50–10% of nitrile are applicable. The copolymers containing from 25–30% of acrylonitrile are preferable and may be prepared as follows; the parts given are by weight:

74 parts butadiene
26 parts acrylonitrile
4 parts sodium soap of tallow acids
6 parts octyl mercaptan
0.3 part potassium persulfate
200 parts water were heated at 30° C. for 17 hours in a pressure bottle while shaking. The latex was stabilized by the addition of 0.5%, based on the polymer, of 2,6 di tertiary butyl para cresol. The latex was coagulated with brine, washed with alcohol and water, and dried at 125° C. A liquid viscous oil was obtained in yield equivalent to 79% of the monomers in the feed. The product obtained contained 28% of combined nitrile and had a molecular weight of 13,000. On solution of the polymer followed by fractional precipitation no rubber-like fractions were obtained.

The copolymers of dienes with acrylnotrile or methacrylonitrile used in accordance with this invention are liquid, oily materials even when the reaction is carried to 80–90% monomer conversion and have an intrinsic viscosity of between about 0.05 and 0.4.

The resins which may be plasticized with liquid, oily, diene-nitrile copolymers are polyvinyl chloride, polyvinylidene chloride and vinyl- and vinylidene chloride copolymers in which vinyl chloride or vinylidene chloride constitutes a major proportion of the monomer mixture. Monomers which may be copolymerized with vinyl chloride or vinylidene chloride include vinyl acetate, maleate esters, acrylic acid esters, methacrylic acid esters, vinylidene chloride, fumaric acid esters, maleic anhydride, and the like. The oils of the invention are also of interest for plasticizing the said vinyl resins after further chlorination.

The compositions in accordance with the present invention contain a major proportion of vinyl resin, generally not less than about 50% of the composition and not more than about 50% of the liquid, oily, diene-nitrile copolymer plasticizer. The preferred range of composition is 60 to 80% of vinyl resin and 40 to 20% of liquid, oily, diene-nitrile copolymer.

The plasticized vinyl resin compositions prepared in accordance with the present invention are particularly valuable for preparing hose suitable for handling mineral and vegetable oils and for coating and/or impregnating various substrate such as paper, cloth, wood and the like. Such compositions may be used as such, or other materials may be incorporated therein such as other conventional plasticizing agents such as phthalates, sebacates, tricresyl phosphates, other phosphates and the like, dyes and pigments, other resins, fillers such as carbon blacks, aluminum powder, mica, whiting, natural rubber and various synthetic rubbers. The compositions may be used in the raw state or they may be vulcanized with sulfur or other suitable vulcanizing agents in order to "set up" the mixture once that it has been formed properly.

The following examples serve to illustrate the present invention:

Example 1

Three butadiene-acrylonitrile copolymers were prepared essentially according to the above recipe except for variations in the ratio of diene to acrylonitrile. The ratios of butadiene to acrylonitrile used were 85/15, 74/26 and 65/35. The several polymers were separated, washed and dried whereupon each of the oily polymers was incorporated in a vinyl chloridevinyl acetate copolymer resin, in the ratio of 30% oily copolymer to 70% of resin whereupon the compositions were calendered to form sheets. The sheets were then tested for tensile strength and freeze resistance. The results obtained are summarized in the following table:

| Stock No. | 1 | 2 | 3 |
| --- | --- | --- | --- |
| Vinyl chloride-Acetate Resin | 70 | 70 | 70 |
| Butadiene 85/Acrylonitrile 15 | 30 | | |
| Butadiene 74/Acrylonitrile 26 | | 30 | |
| Butadiene 65/Acrylonitrile 35 | | | 30 |
| Tensile Strength, Lbs./Sq. In. (Sheeted Film): | | | |
| Parallel to Grain | 3,350 | [1] 5,720 | 4,560 |
| Across Grain | 3,350 | 4,330 | [2] 1,950 |
| Thiokol Bend, °F.:[3] | | | |
| O. K. | −5 | 0 | 0 |
| Broke | −10 | −5 | −5 |

[1] Elongation, 160%.
[2] Elongation, 250%.
[3] The thiokol bend is A. S. T. M. test D-736–43T.

It was found to be impossible to sheet or calender the vinyl resin without a plasticizer while the compositions containing the oily, diene-nitrile copolymers were readily sheeted out. The data would seem to indicate that copolymers containing the order of 26% nitrile are to be preferred since the sample tested gave the best tensile strengths and as good or better freeze resistance than either of the other copolymers.

Example 2

A sample of a copolymer of 74 parts of butadiene and 26 parts of acrylonitrile was prepared according to the above recipe, separated, washed and dried. The oily copolymer was then incorporated in a vinyl chloride-vinyl acetate copolymer resin in the ratio of 20% oily copolymer to 80% resin and 30% oily copolymer to 70% of resin. In order to compare the efficacy of the oily copolymer plasticizer with a conventional plasticizer, the same vinyl chloride-vinyl acetate copolymer resin was compounded with tricresyl phosphate in the same concentrations; i. e., 20% and 30%. These plasticized stocks were molded and calendered and the resulting products were then tested for heat softening point, tensile strength, and freeze resistance. The results of these tests are summarized in the following table, the parts given being by weight:

| | | | | |
|---|---|---|---|---|
| Vinyl Chloride-Vinyl Acetate Resin (Parts) | 80 | 70 | 80 | 70 |
| Tricresyl Phosphate (Parts) | 20 | 30 | | |
| Oily Butadiene-Acrylonitrile Copolymer (Parts) | | | 20 | 30 |
| Heat Softening Point, °C | 20-30 | 20-30 | 40-50 | 30-40 |
| Molded Tensile, Lbs./Sq. in. | 4,290 | 3,030 | 4,850— | 3,820— |
| Per Cent Elongation | 260 | 210 | 190 | 280 |
| Shore Hardness (30 sec.) | 98 | 96 | 100 | 94 |
| Tensile Elongation on Calendered Sheets: | | | | |
| Parallel to grain | 3,670# 30% | 3,070# 145% | 5,050# 20% | 5,560# 145% |
| Across grain | 5,000— 140 | 4,460— 140 | 5,270— 10 | 6,050— 160 |
| Thiokol Bend, °F.: | | | | |
| O. K. | 15 | 15 | 10 | 10 |
| Broke | 10 | 10 | 5 | 5 |

It should be noted that it is impossible to calender a vinyl chloride-vinyl acetate copolymer without the use of a plasticizer and molding of the unplasticized stock is extremely difficult necessitating the use of temperatures of 310° F. or higher. The tricresyl phosphate improved the processability of the resin but even with this plasticizer considerable difficulty was encountered in calendering the material into sheet form. The oily butadiene-acrylonitrile copolymer even in concentrations as low as 20% made it possible to calender the resins easily giving clear sheets with few imperfections. A further particular advantage of the butadiene-acrylonitrile copolymers as plasticizers resides in the fact that they allow the resin to retain a much higher percentage of its original tensile strength and heat softening point and gave products of better low temperature flexibility as measured by the Thiokol bend test.

Example 3

A sample of low molecular weight, oily copolymer of butadiene and acrylonitrile (74 parts of the former, 26 parts of the latter) was incorporated in polyvinyl chloride resin in the ratio of 40% oily copolymer to 60% resin. This composition was found to be thoroughly compatible and had excellent tensile strength as well as good flexibility at normal and low temperatures.

Example 4

A sample of low molecular weight, oily copolymer of butadiene and acrylonitrile (74 parts of the former, 26 parts of the latter) was incorporated in vinyl chloride-vinyl acetate copolymer resin in the ratio of 33% oily copolymer to 67% resin. This composition was completely compatible and had excellent tensile strength in addition to good flexibility.

Example 5

A sample of low molecular weight, oily copolymer of butadiene and acrylonitrile (74 parts of the former and 26 parts of the latter) was incorporated in polyvinylidene chloride powder resin in the ratio of 33% oily polymer to 67% resin. The composition was found to be readily processable, completely compatible, and possessed excellent flexibility and tensile strength.

The foregoing description contains a limited number of embodiments of the present invention. It will be understood, however, that numerous variations are possible without departing from the scope of the following claims.

What we claim and desire to secure by Letters Patent is:

1. A composition of matter comprising a major proportion of a resin selected from the group consisting of polyvinyl chloride, polyvinylidene chloride, vinyl chloride-vinylidene chloride copolymers and vinyl chloride-vinyl acetate copolymers, and a minor proportion of a liquid, oily copolymer having an intrinsic viscosity in the range of 0.05 to 0.4, and prepared by polymerizing at a temperature between 10° C. and 35° C. a mixture of a major proportion of a conjugated diolefin of from 4 to 6 carbon atoms per molecule and a minor proportion of a nitrile selected from a group consisting of acrylonitrile and methacrylonitrile in aqueous emulsion in the presence of at least 3 and up to about 12 weight percent, based on the monomers, of an aliphatic mercaptan of from 6 to 16 carbon atoms, and carrying the conversion to about 80 to 90% of the monomers, the amount of said liquid, oily copolymer present being sufficient to exert a substantial plasticizing effect upon the resin, and said liquid, oily copolymer containing no rubber-like constituents and having no rubber-like properties.

2. A composition of matter as described in claim 1 in which the conjugated diolefin is butadiene.

3. A composition of matter as described in claim 1 in which the conjugated diolefin is isoprene.

4. A composition of matter comprising from 60 to 80 percent by weight of a resin selected from the group consisting of polyvinyl chloride, polyvinylidene chloride, vinyl chloride-vinylidene chloride copolymers and vinyl chloride-vinyl acetate copolymers, and from 40 to 20 percent by weight of a liquid, oily copolymer having an intrinsic viscosity in the range of 0.05 to 0.4, and prepared by polymerizing at a temperature between 10° C. and 35° C. a mixture of from 50 to 90 percent by weight of butadiene and from 50 to 10 percent by weight of acrylonitrile in aqueous emulsion in the presence of at least 3 and up to about 12 weight percent, based on the monomers, of a tertiary aliphatic mercaptan of from 6 to 16 carbon atoms, and carrying the conversion to about 80 to 90 percent of the monomers, the amount of said liquid, oily copolymer present being sufficient to exert a substantial plasticizing effect upon the resin, and said liquid, oily copolymer containing no rubber-like constituents and having no rubber-like properties.

5. A composition of matter comprising from 60 to 80 percent by weight of a polyvinyl chloride resin and from 40 to 20 percent by weight of a liquid, oily copolymer having an intrinsic viscosity in the range of 0.05 to 0.4, a molecular weight of about 13,000, and prepared by polymerizing at a temperature between 10° C. and 35° C. a mixture of about 74 percent by weight of butadiene and about 26 percent by weight of acrylonitrile in aqueous emulsion in the presence of at least 3 and up to about 12 weight percent, based on the monomers, of a tertiary aliphatic mercaptan having 8 carbon atoms, and carrying the conversion to about 80 to 90 percent of the monomers, the amount of said liquid, oily copolymer present being sufficient to exert a substantial plasticizing effect upon the resin, and said liquid, oily copolymer containing no rubber-like constituents and having no rubber-like properties.

RAYMOND G. NEWBERG.
OBER C. SLOTTERBECK.
BYRON M. VANDERBILT.

(References on following page)

REFERENCES CITED

The following references are of record in the file of this patent:

UNITED STATES PATENTS

| Number | Name | Date |
|---|---|---|
| 1,938,662 | Lawson | Dec. 12, 1933 |
| 2,217,632 | Wolfe | Oct. 8, 1940 |
| 2,281,375 | Nowak | Apr. 28, 1942 |
| 2,330,353 | Henderson | Sept. 28, 1943 |
| 2,409,276 | Harvey | Oct. 15, 1946 |
| 2,412,216 | Harvey | Dec. 10, 1946 |
| 2,460,038 | Serniuk | Jan. 25, 1949 |
| 2,469,132 | Schulze et al. | May 3, 1949 |

FOREIGN PATENTS

| Number | Country | Date |
|---|---|---|
| 492,998 | Great Britain | Sept. 30, 1938 |
| 545,765 | Great Britain | June 11, 1942 |
| 845,954 | France | May 22, 1939 |

OTHER REFERENCES

Sebrell: Ind. & Eng. Chem., July 1943, pages 736, 740–742.

Snyder et al.: J. Am. Chem. Soc., vol. 68, August 1946, pages 1422–1431.

Official Digest, No. 262, Nov. 1946, pages 615–622.